United States Patent
Brink et al.

(10) Patent No.: US 12,027,967 B2
(45) Date of Patent: Jul. 2, 2024

(54) HIGH-SIDE FET TWO-STAGE ADAPTIVE TURN-OFF

(71) Applicant: TEXAS INSTRUMENTS INCORPORATED, Dallas, TX (US)

(72) Inventors: Stephen Isaac Brink, Manchester, NH (US); Wei Da, Manchester, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 267 days.

(21) Appl. No.: 17/490,151

(22) Filed: Sep. 30, 2021

(65) Prior Publication Data

US 2023/0095105 A1   Mar. 30, 2023

(51) Int. Cl.
*H02M 3/158* (2006.01)
*H02M 1/00* (2006.01)
*H02M 1/088* (2006.01)
*H02M 1/32* (2007.01)
*H02M 3/156* (2006.01)

(52) U.S. Cl.
CPC ......... *H02M 1/088* (2013.01); *H02M 1/0048* (2021.05); *H02M 1/32* (2013.01); *H02M 3/158* (2013.01); *H02M 3/156* (2013.01)

(58) Field of Classification Search
CPC ............. H02M 1/0029; H02M 1/0048; H02M 1/0058; H02M 1/088; H02M 1/32; H02M 3/156; H02M 3/158; H02M 3/1584; H03K 17/04106; H03K 17/04123; H03K 17/063; H03K 17/081; H03K 17/08104; H03K 17/161; H03K 17/162; H03K 17/163; H03K 17/687; H03K 2017/066
See application file for complete search history.

(56) References Cited

U.S. PATENT DOCUMENTS

| | | | |
|---|---|---|---|
| 10,425,075 B1* | 9/2019 | Consoer | H02M 1/088 |
| 2008/0061867 A1 | 3/2008 | Kaya | |
| 2011/0148376 A1* | 6/2011 | Xu | H03K 17/165 327/434 |
| 2013/0241601 A1* | 9/2013 | Chen | H03K 17/063 327/108 |

(Continued)

FOREIGN PATENT DOCUMENTS

| | | | | |
|---|---|---|---|---|
| CN | 105164598 A | * | 12/2015 | ............ H02M 1/088 |
| KR | 10-20060090679 A | | 8/2006 | |
| WO | WO 2016-018645 A1 | | 2/2016 | |

OTHER PUBLICATIONS

Notification of Transmittal of the International Search Report and the Written Opinion of the International Searching Authority, or the Declaration; PCT/US2022/044659; mail date: Jan. 20, 2023; 10 pages.

*Primary Examiner* — Thienvu V Tran
*Assistant Examiner* — Shahzeb K Ahmad
(74) *Attorney, Agent, or Firm* — Charles F. Koch; Frank D. Cimino

(57) ABSTRACT

In an example, a method includes providing a signal to a driver for a switching voltage regulator to turn off a high-side field effect transistor (FET) of the switching voltage regulator. The method also includes reducing a voltage at a source of the high-side FET. The method includes responsive to the signal, turning off a pull-down FET coupled to a gate of the high-side FET. The method also includes commutating current from the high-side FET to a low-side FET.

19 Claims, 4 Drawing Sheets

(56) References Cited

U.S. PATENT DOCUMENTS

| | | | |
|---|---|---|---|
| 2014/0015586 A1* | 1/2014 | Hirler | H01L 29/7395 |
| | | | 327/333 |
| 2019/0140635 A1* | 5/2019 | Abesingha | H03K 17/0822 |
| 2019/0173464 A1* | 6/2019 | Lin | H02M 3/1582 |
| 2020/0007035 A1 | 1/2020 | Mehdi et al. | |

* cited by examiner

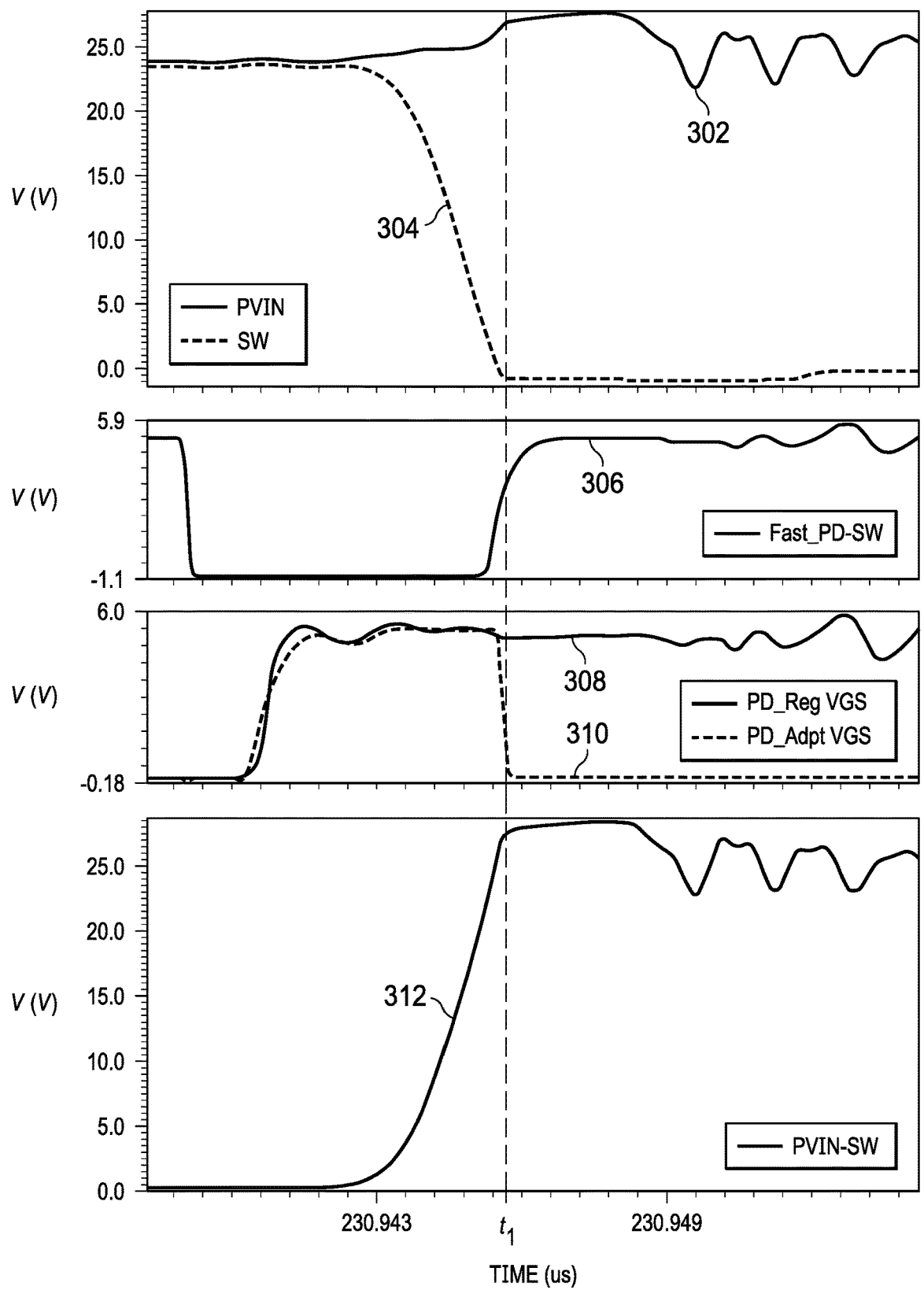

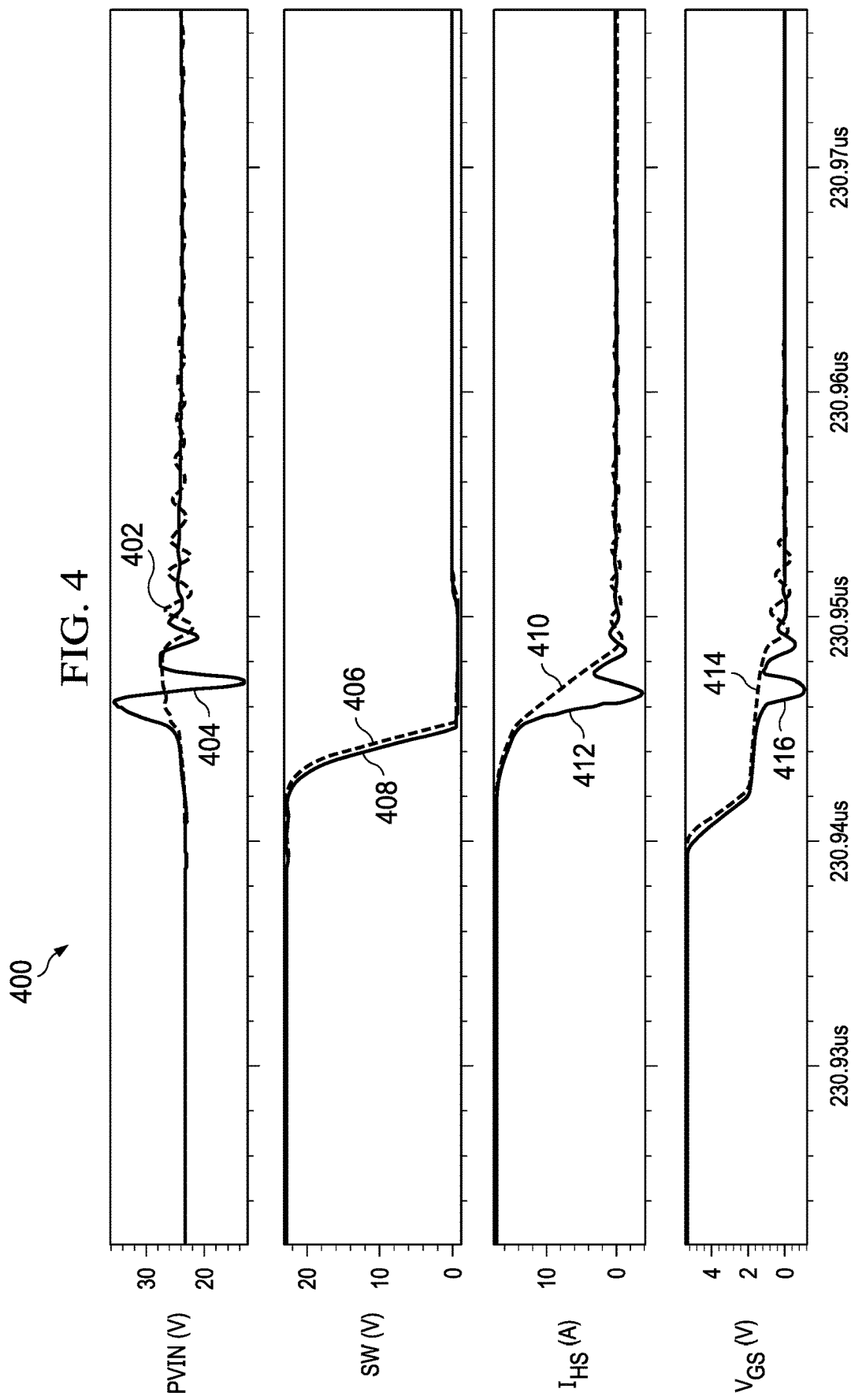

HIGH-SIDE FET TWO-STAGE ADAPTIVE TURN-OFF

BACKGROUND

Switching voltage regulators (also called switching voltage converters) in electronic systems receive an input voltage and input current and provide an output voltage and output current for operating components in the electronic system. In operation, a switching voltage regulator turns power transistors, which are often metal-oxide semiconductor field effect transistors (MOSFETs), on and off rapidly in order to generate the output voltage and output current. A controller provides signals to the power transistors to control the on and off state of the transistors. The switching voltage regulator may be a buck converter, a boost converter, or a buck-boost converter.

SUMMARY

In accordance with at least one example of the description, a method includes providing a signal to a driver for a switching voltage regulator to turn off a high-side field effect transistor (FET) of the switching voltage regulator. The method also includes reducing a voltage at a source of the high-side FET. The method includes responsive to the signal, turning off a pull-down FET coupled to a gate of the high-side FET. The method also includes commutating current from the high-side FET to a low-side FET.

In accordance with at least one example of the description, a system includes a high-side FET of a switching voltage regulator, the high-side FET having a gate, a source, and a drain, the drain adapted to be coupled to a power supply. The system also includes a first pull-down FET having a gate, a drain coupled to the gate of the high-side FET, and a source coupled to the source of the high-side FET. The system includes a second pull-down FET having a gate, a drain coupled to the gate of the high-side FET, and a source coupled to the source of the high-side FET. The system also includes a first FET having a gate, a drain coupled to the gate of the first pull-down FET, and a source coupled to the source of the high-side FET. The system includes a second FET having a gate, a drain coupled to the gate of the first pull-down FET, and a source coupled to the source of the high-side FET.

In accordance with at least one example of the description, a system includes a controller for a switching voltage regulator. The system also includes a high-side field effect transistor (FET) and a low-side FET for the switching voltage regulator. The system includes a low-side driver coupled to the low-side FET and to the controller. The system also includes a high-side driver coupled to the high-side FET and to the controller, where the high-side driver is configured to turn off a pull-down FET coupled to the high-side FET responsive to a drop in a voltage at a source of the high-side FET.

BRIEF DESCRIPTION OF THE DRAWINGS

FIG. 3 is a collection of waveforms in accordance with various examples.

FIG. 4 is a collection of waveforms in accordance with various examples.

DETAILED DESCRIPTION

Figure 1:
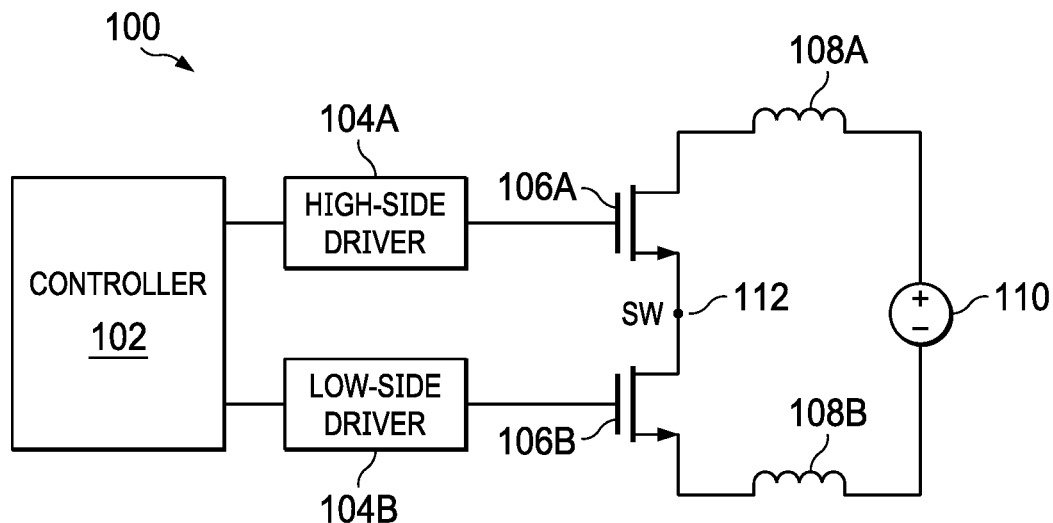
FIG. 1 is a diagram of a system for a switching voltage regulator in accordance with various examples.

A switching buck regulator includes a driver for a high-side FET and a driver for a low-side FET. A controller turns the high-side FET and the low-side FET on and off to produce an output voltage and output current at a switch node. During the high-side FET turn-off, a pull-down transistor pulls down the voltage at the gate of the high-side FET. After the switch node reaches a low voltage such as a ground voltage, a spike occurs in the voltage at the drain of the high-side FET. This spike may cause an undesirable ringing in this voltage. The spike is caused by the current commutating from the high-side FET to the low-side FET after the high-side FET is turned off by the controller. The spike in voltage at the drain of the high-side FET causes a large drain-to-source voltage across the high-side FET. A large drain-to-source voltage may damage the high-side FET.

One conventional solution to prevent damage to the high-side FET is to have a pull-up device that counters the pull-down transistor. The pull-up device is activated after the drain-to-source voltage of the high-side FET reaches a predetermined threshold (e.g., a trigger point). The gate of the high-side FET is pulled up by the pull-up device to counter the pulling down of the gate by the pull-down transistor. With this solution, the drain-to-source voltage is clamped or limited to a predetermined amount. However, in this approach the clamp may be limited by variability in the clamp trigger point, especially if the clamp is triggered by a resistor and capacitor. The variability in the trigger point increases in proportion to the maximum voltage rating of the regulator. Diode-based clamps may also be limited by certain process limitations. This pull-up solution also calls for a large pull-up device to overwhelm the pull-down transistor, which increases the silicon area of the switching regulator.

Another conventional solution includes a delay from a resistor-capacitor circuit to change the pull-down strength of the pull-down transistor with an open loop. This solution has a fixed timing delay from the start of the high-side FET turn-off to the release of the pull-down transistor. The fixed timing delay adds variability to this solution that may result in increased power loss (if the delay is too short) or increased ringing that could damage the high-side FET (if the delay is too long).

In examples herein, circuitry is described that weakens the pull-down strength of the high-side FET. The pull-down strength is weakened after the circuit detects that the switch node reaches a certain voltage (such as ground) during the high-side FET turn-off. The pull-down transistor is weakened by turning off a pull-down transistor. Weakening the pull-down strength reduces voltage ringing at the drain of the high-side FET, which reduces the drain-to-source voltage across the high-side FET. The slew rate of the switch node also remains high in examples herein. With the examples described herein, a large additional power device is not useful to work against the pull-down transistor, as in the clamp method described above. Therefore, the examples herein do not contain a large pull-up device that increases silicon area. Also, the examples described herein do not have a fixed timing delay as described in one of the conventional solutions above. Therefore, lower power loss is achieved while still preventing damage to the high-side FET in the examples described herein.

In examples herein, smaller silicon die area for the switching regulator is useful compared to conventional solutions. Also, lower voltage ringing allows for a lower voltage rated power FET in the regulator, which may reduce die area. The circuit described in examples herein may also be smaller than the conventional clamp approach described above, which also reduces die area.

In examples herein, the same reference numbers or other reference designators are used in the drawings to designate the same or similar (functionally and/or structurally) features.

FIG. 1 is a diagram of a system 100 for a switching voltage regulator in accordance with various examples herein. System 100 includes a controller 102, high-side driver 104A and low-side driver 104B (collectively, drivers 104), high-side FET 106A and low-side FET 106B (collectively, FETS 106), parasitic inductances 108A and 108B (collectively, parasitic inductances 108), power supply 110, and switch node 112. System 100 is a buck converter in various examples. The scope of this description is not limited to buck converters, and other types of converters, such as boost converters and buck-boost converters may be present in other examples.

Controller 102 is coupled to high-side driver 104A and low-side driver 104B. Controller 102 controls drivers 104 by providing various control signals to drivers 104, and also by providing pulse width modulation (PWM) signals to drivers 104. A gate of high-side FET 106A is coupled to high-side driver 104A. A drain of high-side FET 106A is coupled to a positive side of power supply 110. A source of high-side FET 106A is coupled to switch node 112 and to a drain of low-side FET 106B. High-side FET 106A is an n-channel device in this example. A gate of low-side FET 106B is coupled to low-side driver 104B. A source of low-side FET 106B is coupled to ground or a negative side of power supply 110, referred to as power ground (PGND) in some examples herein.

In system 100, after high-side FET 106A turns off, the voltage at switch node 112 begins to fall. As the voltage at switch node 112 reaches PGND (0 volts in some examples), the current in high-side FET 106A commutes to low-side FET 106B. Responsive to the current commutation, the voltage at the drain of high-side FET 106A (referred to herein as PVIN) rises and/or exhibits ringing. This ringing in PVIN causes a large drain-to-source voltage ($V_{DS}$) across high-side FET 106A. The high $V_{DS}$ across high-side FET 106A may damage high-side FET 106A.

In examples herein, circuitry within high-side driver 104A weakens the pull-down strength of high-side FET 106A responsive to the voltage at switch node 112 reaching PGND during turn-off of high-side FET 106A. Weakening the pull-down strength helps to reduce ringing in PVIN compared to other examples. Reducing ringing in PVIN helps to protect high-side FET 106A and other circuit components from damage. The circuitry that weakens the pull-down strength of high-side FET 106A is described with respect to FIGS. 2 and 3 below.

Figure 2:
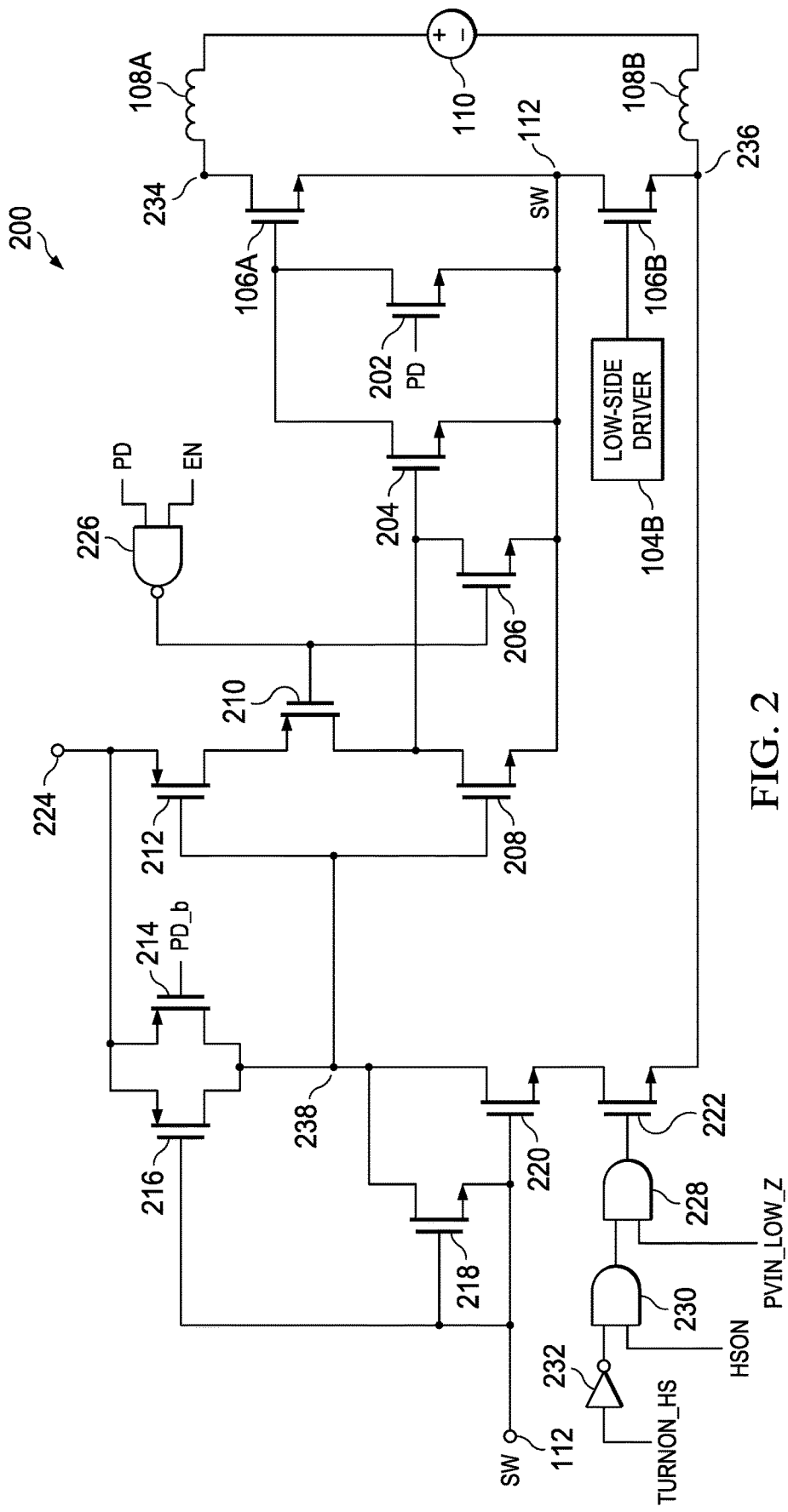
FIG. 2 is a circuit diagram of a system for a switching voltage regulator in accordance with various examples.

FIG. 2 is a circuit diagram of a system 200 for a switching voltage regulator in accordance with various examples herein. System 200 includes some components described above with respect to FIG. 1, and are indicated by the reference numerals shown in FIG. 1. System 200 includes low-side driver 104B, FETS 106, parasitic inductances 108, power supply 110, and switch node 112. System 200 also includes FETS 202 and 204, which are referred to as pull-down FETS in this example. System 200 also includes FETS 206, 208, 210, 212, 214, 216, 218, 220, and 222. System 200 includes BOOT voltage terminal 224, NAND gate 226, AND gates 228 and 230, and inverter 232. System 200 also includes nodes 234, 236, and 238. Node 234 is the PVIN node, node 236 is the PGND node, and node 238 is referred to herein as the fast pull-down (FAST_PD) node.

The operation of system 200 is described herein with reference to FIG. 3. FIG. 3 is a collection of waveforms 300 in accordance with various examples described herein. In FIG. 3, the x-axis represents time in microseconds, while the various y-axes represent voltage in volts. Waveform 302 represents the voltage PVIN at the drain of high-side FET 106A. Waveform 304 represents the voltage at switch node 112. Waveform 306 represents the voltage at the FAST_PD node 238 minus the voltage at switch node 112. Waveform 308 represents the gate-to-source voltage of FET 202. Waveform 310 represents the gate-to-source voltage of FET 204. Waveform 312 represents the voltage PVIN minus the switch voltage at switch node 112 (PVIN-SW). PVIN-SW is the drain-to-source voltage across high-side FET 106A.

FETS 202 and 204 are pull-down devices. FET 204 may be referred to as a first pull-down FET, and FET 202 may be referred to as a second pull-down FET in some examples. FETS 202 and 204 are n-channel FETS in this example. FET 202 is a weak device compared to FET 204. In one example, FET 204 is eight to ten times stronger than FET 202. A drain of FET 202 is coupled to the gate of high-side FET 106A. A source of FET 202 is coupled to switch node 112. A gate of FET 202 is coupled to a PD signal. The PD signal is a signal from controller 102 that turns on the high-side FET 106A. The PD signal is also an input to NAND gate 226, along with an EN signal. The EN signal is an enable signal from controller 102 that is on during normal operation. The opposite of the PD signal is PD_b, which is applied to the gate of FET 214.

FET 222 is activated by the circuitry at the bottom left of FIG. 2. This portion of system 200 is also activated by a signal from controller 102 to turn off the high-side FET 106A. A high-side turn-on signal (TURNON_HS) from controller 102 is provided to inverter 232. The TURNON_HS signal de-asserts after the high-side FET 106A is turned off by controller 102, and the output of inverter 232 is provided to AND gate 230. Inverter 232 may have a delay in some examples. The high-side ON signal (HSON) from controller 102 is also provided to AND gate 230. The HSON signal is a FET feedback sensing signal that indicates whether the high-side FET 106A is on or off. HSON shuts off FET 222 after the high-side turn-off event is complete. The output of AND gate 230 is provided as an input to AND gate 228. The second input of AND gate 228 is a signal called PVIN_LOW_Z. This signal can deactivate the circuitry in system 200 if the PVIN voltage falls below a predetermined threshold. After FET 222 is turned on, node 238 is pulled low. PD signal asserts after TURNON_HS de-asserts, which turns on FETS 202 and 204

To turn off high-side FET 106A, the circuit in system 200 is activated by controller 102 asserting the PD signal. The PD and PD_b signals activate the circuitry in system 200. If the PD signal is high and PD_b is low, FET 202 is enabled directly by the PD signal. The other high-side FET pull-down transistor FET 204 is activated through FETS 210 and 212, because node 238 is still pulled low and waiting for switch node 112 to fall. FETS 210 and 212 are p-channel FETS in this example. As switch node 112 approaches PGND node 236, FET 222 cannot keep node 238 low any longer. Therefore, node 238 goes high and FET 204 turns off. As FET 204 shuts off, the pull-down strength of the high-side FET 106A weakens. The effect is that the drain-to-source voltage of high-side FET 106A (e.g., waveform 312) stops rising. If the drain-to-source voltage of high-side FET 106A stops rising, ringing of the voltage PVIN is reduced at the drain of high-side FET 106A. With FET 204 turned off, FET 202 sinks current in system 200. A result is that the current is not commuted through high-side FET 106A at such a high rate that high-side FET 106A is damaged.

The transition point $t_1$ for system 200 is shown with a vertical dotted line in FIG. 3. The voltage at switch node 112 (waveform 304) begins to fall and reaches zero at time $t_1$. Waveform 306 is the voltage difference between node 238 (FAST_PD) and the switch node 112 (SW). The rising edge of waveform 306 just prior to time $t_1$ shuts off FET 204. Waveform 310 shows that the gate-to-source voltage of FET 204 drops at time $t_1$, which turns off FET 204. The turning off of FET 204 reduces the change in voltage across high-side FET 106A resulting from the change in current through high-side FET 106A, which allows a fast slew rate of the voltage without a large ringing in the PVIN voltage. Also, at time $t_1$, waveform 312 shows that the voltage across high-side FET 106A rises at a much slower rate.

The operation of system 200 may be described in conjunction with FIG. 3, as described above. As the voltage at switch node 112 drops (see waveform 304), FET 222 comes out of saturation mode (caused by FET 220, coupled to switch node 112 as shown in FIG. 2) and can no longer pull down node 238. The voltage at node 238 rises as shown in waveform 306 due to FETS 214 and 216, which may be p-channel FETS in some examples. Waveform 306 represents the gate-to-source voltage for FET 208. As this gate-to-source voltage rises at time $t_1$ in FIG. 3, FET 208 reduces the voltage at the gate of FET 204, thereby turning off FET 204 as described above. Turning off FET 204 slows down the current commutation from high-side FET 106A to low-side FET 106B, which limits the drain-to-source voltage across high-side FET 106A as described above. After the high-side FET 106A is turned off completely, controller 102 asserts a signal (e.g., sensing signal HSON) that turns off FET 222. Turning off FET 222 if it is not in use reduces power consumption of system 200.

FIG. 4 is a collection of waveforms 400 in accordance with various examples described herein. Waveforms 400 show voltage and current values of examples herein compared to a switching regulator that does not employ the circuitry described above with respect to FIG. 2. The x-axis represents time, while the y-axes represent voltage or current, as described herein.

Waveform 402 is the PVIN voltage (at the drain of high-side FET 106A) in volts, in accordance with examples herein, and waveform 404 is the PVIN voltage without the high-side driver circuitry described herein. Waveform 406 is the voltage at switch node 112 in accordance with examples herein, and waveform 408 is the voltage at a switch node without the high-side driver circuitry described herein. Waveform 410 is the current through high-side FET 106A in accordance with examples herein, and waveform 412 is the current through a high-side FET without the high-side driver circuitry described herein. Waveform 414 is the gate-to-source voltage of the high-side FET 106A in accordance with examples herein, while waveform 416 is the gate-to-source voltage of a high-side FET without the high-side driver circuitry described herein. Waveforms 400 show the advantages of the example circuitry described herein.

Waveform 402 shows that the ringing in the PVIN voltage at the drain of the high-side FET 106A is reduced in accordance with examples herein. Without the circuitry described herein, waveform 404 shows that the PVIN voltage experiences a high level of ringing as the current is commutated from the high-side FET 106A to the low-side FET 106B. In contrast, waveform 402 shows that the high-side driver circuitry described herein reduces the ringing of the PVIN voltage.

Waveform 406 is the voltage at switch node 112 in accordance with various examples herein, and waveform 408 is the voltage at a switch node for a system without the high-side driver circuitry described herein. Waveforms 406 and 408 are similar to one another, which shows that the driver circuitry described in examples herein does not significantly alter the slew rate of the voltage at switch node 112. Waveform 406 shows that a high slew rate may be achieved in conjunction with lower ringing of the PVIN voltage.

Waveform 410 is the current ($I_{HS}$) through the high-side FET 106A in accordance with various examples herein, and waveform 412 is the current through a high-side FET in a system without the high-side driver circuitry described herein. Waveform 410 shows a smooth decrease in the current with little ringing as the voltage at the switch node 112 drops. Waveform 412 shows a larger amount of ringing of the current through a high-side FET as the current commutates to the low-side FET. The examples described herein therefore reduce ringing in the current through the high-side FET 106A. A smoother reduction in the current $I_{HS}$ helps to reduce ringing of the PVIN voltage and protect high-side FET 106A from damage.

Waveform 414 is the gate-to-source voltage ($V_{GS}$) of high-side FET 106A in accordance with various examples herein, and waveform 416 is the $V_{GS}$ of a high-side FET in a system without the high-side driver circuitry described herein. Waveform 416 shows less ringing in the $V_{GS}$ than waveform 418. The examples described herein therefore reduce ringing of the $V_{GS}$ compared to a system without the high-side driver circuitry described herein.

Figure 5:
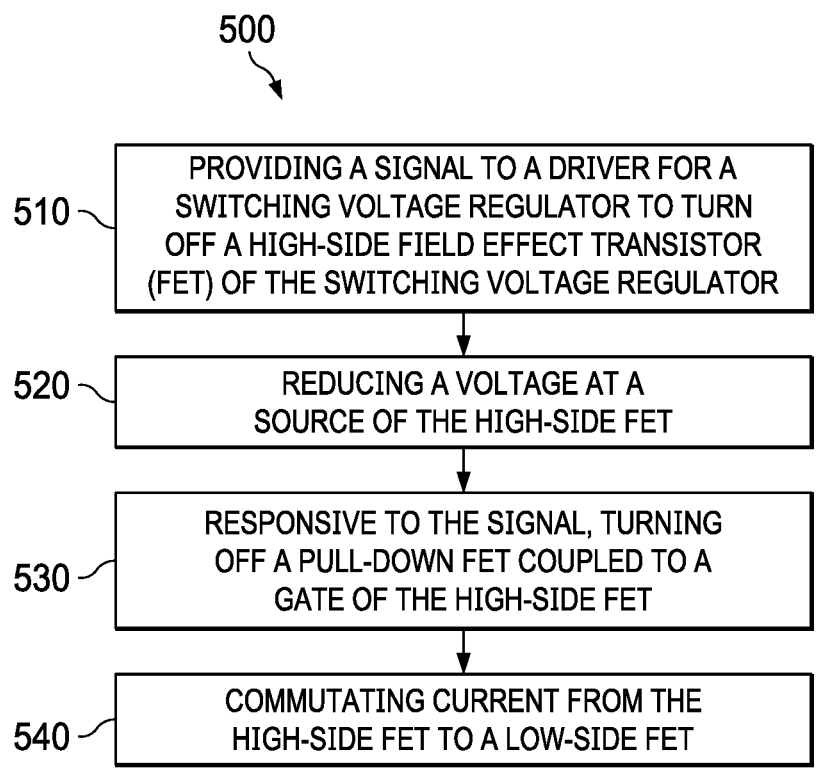
FIG. 5 is a flow diagram of a method for two-stage adaptive turn-off of a high-side FET in accordance with various examples.

FIG. 5 is a flow diagram of a method 500 for a two-stage adaptive turn-off of a high-side FET in a switching voltage regulator in accordance with various examples herein. The steps of method 500 may be performed in any suitable order. The hardware components described above with respect to FIGS. 1 and 2 may perform method 500 in some examples.

Method 500 begins at 510, where a controller provides a signal to a driver for a switching voltage regulator to turn off a high-side FET of the switching voltage regulator. The controller may be controller 102 in one example. The high-side FET may be high-side FET 106A in an example.

Method 500 continues at 520, where a voltage is reduced at a source of the high-side FET. The voltage may be the voltage at switch node 112 as described above. The voltage at switch node 112 drops as shown in waveform 304 responsive to the controller 102 turning off high-side FET 106A.

Method 500 continues at 530, where responsive to the signal, a pull-down FET coupled to a gate of the high-side FET is turned off. The pull-down FET may be turned off with any suitable circuitry. In one example described herein, FET 208 (e.g., first FET 208) may turn on and turn off a pull-down FET, such as pull-down FET 204. FET 208 may be turned on via any suitable circuitry, and may turn on responsive to one or more signals from controller 102.

Method 500 continues at 540, where current is commutated from the high-side FET to a low-side FET. The current is commutated responsive to high-side FET turning off and low-side FET turning on. The state of the high-side FET and the low-side FET may be controlled by signals from controller 102 in one example.

In examples herein, circuitry is described that weakens the pull-down strength of the high-side FET. The pull-down strength is weakened if the circuit detects that the switch node reaches a certain voltage during the high-side FET turn-off. Weakening the pull-down strength reduces voltage ringing at the drain of the high-side FET, which reduces the drain-to-source voltage across the high-side FET. The slew rate of the switch node also remains high in examples herein. In examples herein, smaller silicon die area for the switching regulator is useful compared to conventional solutions. Also, lower voltage ringing allows for a lower voltage rated power FET in the voltage regulator, which can reduce die area.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

While certain components may be described herein as being of a particular process technology, these components may be exchanged for components of other process technologies. Circuits described herein are reconfigurable to include the replaced components to provide functionality at least partially similar to functionality available prior to the component replacement.

While the use of particular transistors are described herein, other transistors (or equivalent devices) may be useful instead with little or no change to the remaining circuitry. For example, a metal-oxide-silicon FET ("MOSFET") (such as an n-channel MOSFET, NFET, or a p-channel MOSFET, PFET), a bipolar junction transistor (BJT—e.g., NPN or PNP), insulated gate bipolar transistors (IGBTs), and/or junction field effect transistor (JFET) may be useful in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs). While, in some examples, certain elements may be included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
providing a high-side field effect transistor (FET) and a low-side FET for a switching voltage regulator, wherein the high-side FET and the low-side FET are connected at a switching terminal that provides an output voltage;
providing a signal to a driver coupled to a control terminal of the high-side FET to turn off the high-side FET;
providing first and second pull-down FETs, each coupled between a gate of the high-side FET and the switching terminal, wherein a control terminal of the second pull-down FET is coupled to the driver, a control terminal of the first pull-down FET is coupled to a pull-down terminal, and the second pull-down FET is stronger than the first pull-down FET;
responsive to the signal, turning off a pull-down FET coupled to a gate of the high-side FET, wherein the first pull-down FET provides a pull-down current to the high-side FET;
reducing the pull-down current in response to detecting that a voltage at the switching terminal reaches a particular voltage during turn-off of the high-side FET; and
commutating current from the high-side FET to the low-side FET.

2. The method of claim 1, further comprising:
turning off the first pull-down FET by increasing a gate-to-source voltage of another FET coupled to a gate of the pull-down FET.

3. The method of claim 1, wherein the method includes the gate of the second pull-down FET receiving the signal.

4. The method of claim 1, wherein turning off the first pull-down FET reduces a pull-down strength of the high-side FET.

5. The method of claim 1, wherein a drain of the pull-down FET is coupled to the gate of the high-side FET, and a source of the first pull-down FET is coupled to the source of the high-side FET.

6. The method of claim 1, wherein a drain of the low-side FET is coupled to a source of the high-side FET.

7. A system, comprising:
a high-side field effect transistor (FET) having a gate, a source, and a drain, wherein the drain is coupled to a power supply terminal, and the source is coupled to a switching terminal;
a first pull-down FET having a gate, a drain, and a source, wherein the drain is coupled to the gate of the high-side FET, and the source is coupled to the source of the high-side FET;

a second pull-down FET having a gate, a drain, and a source, wherein the drain is coupled to the gate of the high-side FET, the source is coupled to the source of the high-side FET, the gate is coupled to a pulldown terminal, and the second pull-down FET is weaker than the first pull-down FET;

a first FET having a gate, a drain, and a source, wherein the drain is coupled to the gate of the first pull-down FET, and the source is coupled to the source of the high-side FET; and a second FET having a gate, a drain, and a source, wherein the drain is coupled to the gate of the first pull-down FET, the source is coupled to the source of the high-side FET.

8. The system of claim 7, wherein the source of the high-side FET is coupled to a drain of a low-side FET.

9. The system of claim 7, wherein the source of the high-side FET is configured to provide an output voltage of a switching voltage regulator.

10. The system of claim 7, wherein the first FET and the second FET are configured to turn off the first pull-down FET.

11. The system of claim 10, wherein the first FET and the second FET are configured to turn off the first pull-down FET responsive to a drop in a voltage at the source of the high-side FET.

12. The system of claim 7, wherein the second pull-down FET is configured to turn on responsive to a signal from a controller that is configured to turn off the high-side FET.

13. The system of claim 7, wherein the first FET is configured to turn on responsive to a drop in a voltage at the source of the high-side FET.

14. A system, comprising:
a controller for a switching voltage regulator;
a high-side field effect transistor (FET) and a low-side FET for the switching voltage regulator coupled in series and connected at a switching terminal;
a low-side driver coupled to the low-side FET and to the controller;
a first pull-down FET coupled between a control terminal of the high-side FET and the switching terminal;
a second pull-down FET coupled between the control terminal of the high-side FET and the switching terminal, wherein the second pull-down FET is stronger than the first pull-down FET; and
a high-side driver coupled to the high-side FET and to the controller, wherein the high-side driver is configured to turn off the first pull-down FET responsive to a drop in a voltage at a source of the high-side FET.

15. The system of claim 14, wherein the first pull-down FET has a gate, a drain coupled to a gate of the high-side FET, and a source coupled to a source of the high-side FET.

16. The system of claim 14, wherein the second pull-down FET is configured to turn on responsive to a signal from the controller that is configured to turn off the high-side FET.

17. The system of claim 14, wherein turning off the first pull-down FET includes reducing a gate-to-source voltage of the first pull-down FET.

18. The system of claim 14, wherein responsive to the drop in the voltage at the source of the high-side FET, the high-side FET commutates current to the low-side FET.

19. The system of claim 14, wherein a source of the high-side FET is coupled to a drain of the low-side FET.

* * * * *